Feb. 7, 1950 A. J. BENT 2,496,904
FLUID PRESSURE CONTROL VALVE DEVICE
Filed May 23, 1947
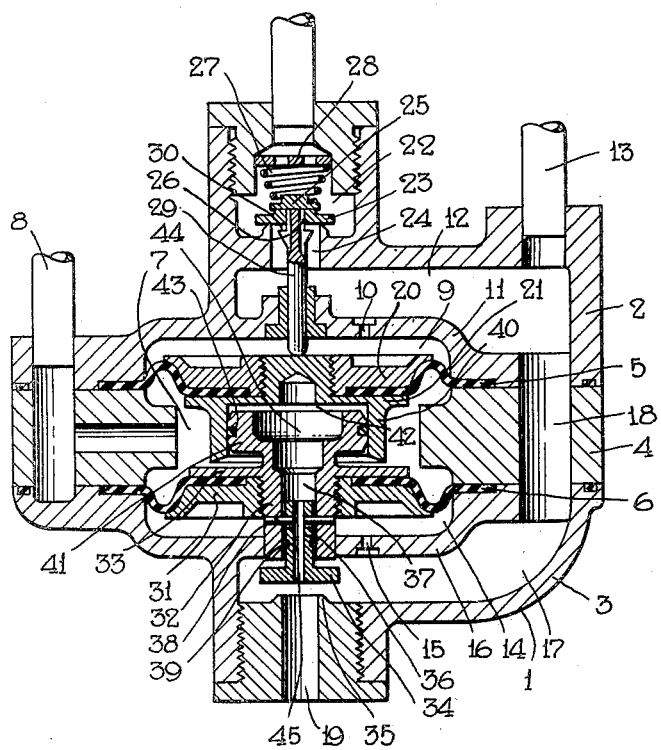
INVENTOR
Arthur J. Bent
BY
Frank E. Miller
ATTORNEY Patented Feb. 7, 1950

2,496,904

UNITED STATES PATENT OFFICE 2,496,904

FLUID PRESSURE CONTROL VALVE DEVICE

Arthur J. Bent, Pittsburgh, Pa., assignor to The Westinghouse Air Brake Company, Wilmerding, Pa., a corporation of Pennsylvania Application May 23, 1947, Serial No. 750,153

5 Claims. (Cl. 303—28)

This invention relates to fluid pressure control valve devices and more particularly to a fluid pressure relay valve device of the self-lapping type.

In a fluid pressure braking system for front and rear wheels of an airplane, for example, it is often desirable to effect braking the front wheel or wheels to a proportionate lesser degree than the rear wheels, and one object of the invention is the provision of an improved fluid pressure controlled relay valve device particularly adapted for use between an operator's control device and brake cylinder devices at the front and rear wheels of such a system for causing the pressure of fluid provided in the brake cylinder device at the front wheel or wheels to be less than provided in the brake cylinder devices at the rear wheels, whereby, in response to operation of said operator's control device the front wheel or wheels will be braked to a lesser degree than the rear wheel or wheels.

A more specific object of the invention is to provide an improved relay valve device which will respond to pressure of a control fluid to deliver fluid at a pressure proportionately lower than the prevailing pressure of said control fluid.

It is another object of the invention to provide a fluid pressure relay valve device embodying differential controlling elements which determine the ratio between the control pressure and the proportional pressure delivered thereby.

It is still another object of the invention to provide a self-lapping fluid pressure relay valve device of the above type which is relatively simple in structure and light in weight and therefore particularly adapted for use in airplane braking systems.

Other objects and advantages will be apparent from the following more detailed description of the invention.

According to the above objects the improved relay valve device comprises a casing containing two coaxially arranged and spaced apart movable abutments, preferably in the form of flexible diaphragms, which cooperate to form between them a control chamber for receiving fluid under pressure from an operator's control device or the like, for controlling operation of said diaphragms and thereby of valves to control supply and release of fluid under pressure to a device being controlled, such as the brake cylinder devices above mentioned. The outer or opposite faces of the diaphragms are subject to pressure of fluid delivered by the relay valve device. Suitable followers are secured to opposite sides of the two diaphragms for the usual reasons, but according to the invention, the followers secured to the adjacent faces of the two diaphragms and therefore disposed in the control chamber are adapted to be provided with differential controlling elements to reduce the area of said diaphragms subject to pressure of fluid in the control chamber to a desired degree less than the area of the diaphragms subject to the pressure of delivered fluid, whereby the pressure of delivered fluid will be a chosen degree less than the control pressure. A relay valve device not having these differential controlling elements will provide a delivered pressure equal substantially to the control pressure. If a relay with the differential controlling elements is therefore employed to control the pressure in the brake cylinder or brake cylinders on the front wheel or wheels of an airplane, and a relay valve device without the controlling elements is provided for controlling the pressure in the brake cylinder or brake cylinders on the rear wheel or wheels of the airplane, then in response to operation of the operator's control device, the brake cylinder devices on the airplane will operate to brake the front wheel or wheels of the airplane to a lesser degree than the rear wheel or wheels, as is desired.

In the accompanying drawing the single figure is a diagrammatic sectional view of a fluid pressure relay valve device constructed in accordance with the invention.

Referring to the drawing, the relay valve device embodying the invention comprises a casing 1 embodying two end sections 2 and 3 and an intermediate section 4 interposed between the two end sections. Two oppositely arranged like movable abutments, preferably in the form of flexible diaphragms 5 and 6, are disposed in the casing, one being clamped around its edge between the casing sections 2 and 4, while the other is clamped around its edges between the casing sections 3 and 4.

Between the two diaphragms is a control chamber 7 connected to a control pipe 8 adapted to in turn be connected to an operator's control device or the like (not shown). At the opposite side of diaghrapm 5 is a chamber 9 connected through a stabilizing port 10 in a partition wall 11 to a chamber 12 connected to a delivery pipe 13 which may be connected to a brake cylinder device (not shown) such as may be employed for braking a wheel of an airplane. At the opposite side of diaphragm 6 is a chamber 14 connected through a stabilizing port 15 in a partition wall 16 to a chamber 17 which is connected to chamber 12 by a passage 18. Chamber 17 is formed in casing section 3 and is adapted to be open to atmosphere through a passage 19.

A follower 20 disposed in chamber 9 is clamped to the adjacent face of diaphragm 5 by a stud projecting from a follower 21 disposed in chamber 7 and clamped to the opposite side of the diaphragm. The numeral 22 designates a supply valve chamber adapted to be supplied with fluid under pressure from any suitable source and containing a supply valve 23 arranged in coaxial relationship with diaphragm 5 and adapted to cooperate with a seat in the casing for controlling communication between said chamber 22 and chamber 12 by way of a passage 24. A pilot valve 25, also contained in chamber 22, is arranged to cooperate with a seat on the supply valve for controlling communication between said chamber 22 and a port 26 through said supply valve, which port opens to passage 24. A spring 27 is contained in chamber 22, supported at one end on a strainer 28 and bearing at the opposite end against the pilot valve 25 for urging it to its seat, and when seated, for urging the supply valve 23 to its seat. A stem 29, engaging at one end the stud portion of follower 21 extends through chamber 9, a bore in the partition wall 11, chamber 12, passage 24 and port 26 with its opposite end in engagement with the pilot valve 25. The portion of said stem extending through port 26 is fluted, and said stem is provided with a shoulder 30 for engaging and unseating the supply valve 23 when the pilot valve 25 is unseated therefrom.

A follower 31 disposed in chamber 14 is clamped to the adjacent face of diaphragm 6 by a stud 32 projecting from a follower 33 disposed in chamber 7 and clamped to the opposite side of the diaphragm. The stud 32 extends through follower 31, chamber 14, and an unthreaded portion thereof extends through an opening in the partition wall 16 and has sliding contact therewith. A release valve 34 carried by stud 32 is disposed in chamber 17 opposite a seat 35 and is adapted to cooperate with said seat for controlling communication between said chamber and the passage 19 open to atmosphere. The valve 34 is provided with a projecting portion 36 which is loosely fit in a central passage 37 opening through the stud 32 to allow the valve 34 freedom to align itself when seating on seat 35, the portion 36 being connected to said stud by pins 38 pressed into openings in the stud and projecting into registering larger openings in said portion 36. A sealing ring 39 is inserted in a groove in portion 36 in sealing engagement with the wall of opening 37 for preventing leakage of fluid under pressure past said portion within said opening.

In accordance with the invention, a cylinder member 40 provided on diaphragm follower 21 is disposed in chamber 7 coaxially with the diaphragm and cooperates with a piston member 41 attached to follower 33 and disposed in the member 40 to form a chamber 42 for reducing the effective areas of the two diaphragms 5 and 6 exposed to pressure of fluid in chamber 7. A sealing ring 43 is disposed in a peripheral groove in piston member 41 in slidable sealing engagement with the inner wall of cylinder member 40 for preventing leakage of fluid under pressure from chamber 7, encircling the members 40 and 41, into chamber 42. Piston member 41 is provided with a central opening 44 connected to opening 37 which is thereby open to a central passage 45 extending through the release valve 34 for connecting the chamber 42 to the atmosphere when said valve is seated on seat 35. The cylinder member 40 and piston member 41 may be of any desired diameter and constitute the differential controlling elements above mentioned.

*Operation*

In operation, let it be initially assumed that the control pipe 8 and control chamber 7 are open to atmosphere, as a result of which, stress of the diaphragms 5 and 6 will cause them to assume a normal or release position in which position they are shown in the drawing. With the diaphragm 5 in its normal position the spring 27 will seat the pilot valve 25 and supply valve 23, while with the diaphragm 6 in its normal position it will be supporting the release valve 34 out of contact with its seat 35, whereby chamber 17, and thereby chambers 14, 12, 9 and the delivery pipe 13 will all be open to atmosphere. Assuming that pipe 13 is connected to a brake cylinder device, the brake cylinder device will be open to atmosphere for releasing the brakes controlled thereby. Let it further be assumed that chamber 22 is supplied with fluid under pressure from any suitable source.

If now it is desired to supply fluid under pressure to pipe 13 and thence to the brake cylinder device for applying brakes, fluid under pressure is supplied to pipe 8 and thence to the control chamber 7. The pressure of fluid thus obtained in chamber 7 will first deflect the diaphragm 6 moving piston member 41 relative to cylinder member 40 and seat the exhaust valve 34, closing the chamber 17 to atmosphere and opening chamber 42 to atmosphere by way of openings 44, 37, passage 45 in the seated exhaust valve, and the exhaust passage 19. Further deflection of diaphragm 6 terminates and the pressure of control fluid in chamber 7 then deflects diaphragm 5, moving cylinder member 40 relative to piston member 41, and by moving stem 29 consecutively unseats the pilot valve 25 and supply valve 23, allowing fluid under pressure from chamber 22 to flow rapidly by way of passage 24 to chamber 12, and thence to pipe 13 connected to the brake cylinder device for applying the brakes. At the same time fluid under pressure will flow from chamber 12 to chamber 17, and slowly into chambers 9 and 14 by way of respective stabilizing ports 10 and 15.

When the pressure of fluid in chamber 9 acting on the entire exposed area one side of the diaphragm 5 increases to a degree sufficient to cause a force, together with the force of spring 27 also acting on diaphragm 5 through stem 29, greater than the opposing force of pressure of control fluid in chamber 7 encircling cylinder member 40 acting on the opposite side of the diaphragm, the diaphragm 5 will deflect in the direction of chamber 7, allowing the spring 27 to consecutively seat the supply valve 23 and pilot valve 25, closing off further supply of fluid under pressure from chamber 22 to chamber 12. The pressure of fluid in control chamber 7 remains effective at this time to maintain the diaphragm 6 positioned against opposition of pressure of fluid in chamber 17 to keep the release valve 34 seated. The valve device is therefore now in lap position with valves 23, 25 and 34 closed.

In accordance with the invention, the pressure of supply fluid now being held in chamber 12 and in the brake cylinder device, assumed to be connected to chamber 12, is proportionately less than the pressure of control fluid in chamber 7, because the effective area of diaphragm 5 exposed to pressure of control fluid in chamber 7 is less than that exposed to pressure of supply fluid in chamber 9 by an amount equal to the area exposed to atmosphere in chamber 42 within cylinder member 40. The ratio of the relative sizes of the effective areas of diaphragm 5 exposed to the respective pressures of the above two fluids determines the ratio of the degree of one pressure with respect to the other, which in turn is dependent upon the diameters of the cooperating cylinder member 40 and piston member 41 which define the chamber 42.

If further increase in pressure of fluid in chamber 12, and thereby in the brake cylinder device assumed to be connected thereto, is desired, pressure of control fluid in chamber 7 will be increased by way of pipe 8, whereupon, while the diaphragm 6 will remain stationary, maintaining the release valve 34 seated, the diaphragm 5 will again be deflected in the direction of chamber 9 and acting through stem 29 again unseat valves 23 and 25, allowing fluid under pressure to flow to chamber 12 by way of passage 24. Valves 23 and 25 will remain open until the pressure of supply fluid acting in chamber 9 connected to chamber 12 reaches an increased pressure in proportion to the increase in pressure of control fluid, and which pressure in chamber 9 is at the same time proportionately lower than the existing pressure of said control fluid for reasons previously described, whereupon valves 23 and 25 again will be closed by spring 27 as diaphragm 5 is caused to return to normal position.

If it is desired to effect a release of fluid under pressure from pipe 13 and thence the brake cylinder device assumed to be connected thereto, the pressure of control fluid in control chamber 7 is reduced by way of pipe 8 in degree proportional to the degree of release desired.

Reduction of pressure of control fluid in chamber 7 acting on one side of diaphragm 6 will allow the pressure of fluid in chamber 14 acting on the opposite side of the diaphragm to move it in the direction of chamber 7, unseating the exhaust valve 34. Fluid under pressure from pipe 13 and thence the brake cylinder device will then flow by way of chamber 12, passage 18, chamber 17 and exhaust passage 19 to the atmosphere, reducing its pressure as flow continues.

This reduction in pressure is at the same time reflected in chamber 14 to which one side of diaphragm 6 is exposed, and when this pressure is reduced a degree proportional to the degree of reduction of pressure of control fluid in chamber 7 acting on the opposite side of diaphragm 6, the diaphragm will again be deflected by action of pressure of the control fluid in the direction of chamber 14 to reseat the exhaust valve 34 and prevent further reduction in pressure of fluid in pipe 13 at this time.

Again in accordance with the invention, the pressure of fluid thus maintained in pipe 13 and the brake cylinder device assumed to be connected thereto is proportionately less than the pressure of control fluid in chamber 7, due to the differential in effective areas on opposite sides of diaphragm 6 exposed to the respective pressures of control fluid in chamber 7 and fluid in chamber 14. As was true in regard to effective areas of diaphragm 5, the effective area of diaphragm 6 exposed to pressure of control fluid in chamber 7 encircling members 40 and 41 is reduced by the area exposed to atmosphere in chamber 42 enclosed by said members. Since these areas of diaphragm 6 are equal to the corresponding areas of diaphragm 5, their ratio is the same and the proportionality between pressure of fluid in chamber 12 and pressure of control fluid in chamber 7 during release operation of the relay valve device is the same as during its supply operation.

If it is desired to further reduce the pressure of fluid in chamber 12 and pipe 13 connected to the brake cylinder device, the pressure of control fluid in chamber 7 is further reduced in degree proportional to the desired reduction in pressure in chamber 12 and pipe 13. As was previously described, the diaphragm 6 will again respond to first unseat the attached valve 34 to release pressure of fluid from chamber 12 and pipe 13 and then respond upon proper reduction of this pressure to reseat valve 34 to maintain in said chamber and pipe a pressure which will be proportionately less than pressure of control fluid in chamber 7 for the above reasons. If pressure of control fluid in chamber 7 is reduced to atmospheric, the diaphragm will return to normal position as shown in the drawing and remain there as the pressure of fluid from pipe 13 reduces to atmosphere.

When the relay valve device is in lap position, maintaining in response to a certain pressure of control fluid in chamber 7 a proportional lesser pressure of supply fluid in pipe 13 and the brake cylinder device assumed to be connected thereto, if fluid under pressure should leak past either of the seated valves 23 or 25 into chamber 12, tending to cause an undesired increase in pressure of fluid in pipe 13 and in the brake cylinder device assumed to be connected thereto, the diaphragm 6 will respond to such an increase to automatically unseat the release valve 34 long enough to bleed off this excess pressure, reseating the valve 34 when pressure of fluid returns to the desired value as dictated by pressure of control fluid.

If, in lap position of the relay valve device, there is an accidental reduction in pressure of fluid in pipe 13, due to leakage out of the valve device, this reduction will be reflected in chamber 9, allowing the pressure of control fluid in chamber 7 to become effective to deflect diaphragm 5 and unseat the pilot valve 25, allowing fluid under pressure to flow from chamber 22 through port 26 in the supply valve 23 to the chamber 12 and thence to pipe 13, making up the undesired reduction. The diaphragm 5 will then respond to the proper pressure of fluid in chamber 9 to effect reseating of the pilot valve 25.

Since the pilot valve 25 has less area exposed to pressure of fluid in chamber 22 than does the supply valve 23 it will offer less resistance to being unseated by the diaphragm 5. Provision of the pilot valve 25 therefore allows diaphragm 5 to respond to a lesser pressure reduction in chamber 9, than would be possible if it needed to unseat the supply valve 23, in order to compensate for accidental reduction in pressure of fluid in the pipe 13. Also due to the relatively small size of the pilot valve, the diaphragm 5 will be able to hold it open until the pressure of fluid in pipe 13 and the connected chambers is increased to a degree more nearly bearing the desired ratio to the control pressure in chamber 7 than if said valve were not employed.

*Summary*

From the above description it will now be seen that the ratio between the control pressure provided in chamber 7 and the pressure of supply fluid obtained in pipe 13 is governed by the effective area on one side of each diaphragm 5 and 6, as limited by the chamber 42, formed by cylinder and piston members 40 and 41, relative to the areas of each on their opposite sides, and that the ratio is therefore determined by the relative size of members 40 and 41. Moreover, it will be seen that if piston member 41 and cylinder member 40 were dispensed with, the ratio of control to delivery pressure would be substantially 1 to 1. Hence, for braking the front and rear wheels of an airplane, a relay valve device such as shown in the drawing could be employed for controlling the pressure in the brake cylinder device on the front wheel or wheels, while a relay valve device of 1 to 1 ratio could be employed for controlling the pressure in the brake cylinder device on the rear wheel or wheels, and in response to an operator's control device, the airplane would be braked to a greater degree on the rear wheels than on the front wheel or wheels, as desired.

Having now described my invention, what I claim as new and desire to secure by Letters Patent is:

1. In a self-lapping relay valve device adapted to respond to pressure of control fluid to control supply of fluid under pressure from a source thereof to a device to be actuated and release of said fluid under pressure therefrom, the combination with a casing having a fluid pressure supply chamber, a fluid pressure delivery chamber and a fluid pressure exhaust opening, supply valve means for opening and closing said supply chamber to said delivery chamber, exhaust valve means for opening and closing said delivery chamber to said exhaust opening, of a first diaphragm for actuating said supply valve means and subject opposingly to pressure of said control fluid and pressure of fluid in said delivery chamber, a second diaphragm for actuating said exhaust valve means disposed in parallel with and spaced away from said first diaphragm and subject opposingly to pressure of said control fluid in common with said first diaphragm and pressure of fluid in said delivery chamber, a first member carried by said first diaphragm, a second member carried by said second diaphragm in slidable sealing engagement with said first member to form an interior chamber between the diaphragm for limiting the effective area of each exposed to pressure of control fluid to a value less than the effective area of each exposed to pressure of fluid in said delivery chamber, and means for connecting said interior chamber to atmosphere 2 In a self-lapping relay valve device adapted to respond to pressure of control fluid to control supply of fluid under pressure from a source thereof to a device to be actuated and release of said fluid under pressure therefrom, the combination with a casing having a fluid pressure supply chamber, a fluid pressure delivery chamber and a fluid pressure exhaust passage for connecting said delivery chamber to atmosphere, supply valve means for opening and closing said supply chamber to said delivery chamber and exhaust valve means for opening and closing said exhaust passage, of a first diaphragm for actuating said supply valve means subject opposingly to pressure of said control fluid and pressure of fluid at delivery pressure, a second diaphragm for actuating said exhaust valve means disposed in parallel with and spaced away from said first diaphragm and subject opposingly to pressure of said control fluid in common with said first diaphragm and pressure of fluid at delivery pressure, a cylinder member carried by said first diaphragm having an open end disposed in the direction of said second diaphragm, a piston member carried by said second diaphragm and projecting therefrom into said cylinder member for slidable sealing engagement with the inner wall thereof and forming a chamber within said cylinder member between said first diaphragm and the projecting end of said piston member for reducing the effective area of each diaphragm exposed to pressure of said control fluid to a value less than the effective area of each exposed to pressure of fluid at delivery pressure, and means for connecting the last named chamber to atmosphere.

3. A self-lapping relay valve device adapted to respond to a relatively small volume of fluid at control pressure from a control valve device to control supply and release of a larger volume of fluid at a proportionately lesser pressure from a source of fluid under pressure to and from a device to be actuated, comprising a casing having a fluid pressure control opening for connection with said control valve device, a fluid pressure supply opening for connection with said source, a fluid pressure delivery opening for connection with said device to be actuated and a fluid pressure exhaust passage open to atmosphere, supply valve means for opening and closing said supply opening to said delivery opening, exhaust valve means for opening and closing said delivery opening to said exhaust passage, first diaphragm means for controlling said supply valve means subject opposingly to pressure of fluid in said control opening and pressure of fluid in said delivery opening, second diaphragm means for controlling said exhaust valve means subject opposingly to pressure of fluid in said control opening and pressure of fluid in said delivery opening and means cooperative with both diaphragm means arranged to define a chamber adapted to contain a fluid substantially at atmospheric pressure for equally reducing the effective area of each that is exposed to pressure of fluid in the control opening to a value less than the effective area of each that is exposed to pressure of fluid in the delivery opening.

4. A fluid pressure relay valve device comprising a casing, two movable abutments in said casing subject on one side to pressure of fluid in a control chamber and subject on the opposite side to pressure of fluid in another chamber, valve means in said casing operable by one of said abutments in response to an increase in pressure in said control chamber to close an exhaust opening from said other chamber and in response to a reduction in pressure in said control chamber to open said exhaust opening, other valve means in said casing operable by the other of said abutments in response to an increase in pressure of fluid in said control chamber to supply fluid under pressure to said other chamber and to cut off said supply upon an increase in pressure in said other chamber on one side of said other movable abutment to counterbalance the opposing pressure on said other abutment, and means intermediate said abutments and cooperable therewith to define a chamber for reducing the area of said abutments subject to control pressure to a degree less than the area subject to pressure in said other chamber, and means for connecting the last named chamber to atmosphere.

5. A fluid pressure relay valve device comprising a casing, two coaxially arranged movable abutments in said casing subject on adjacent sides to pressure of fluid in a control chamber and subject on opposite sides to pressure of fluid in another chamber, said casing having an exhaust opening from said other chamber, a valve seat encircling said opening, an exhaust valve for engaging said seat, means connecting said valve to one of said abutments for movement therewith and cooperative with said one abutment to form therein a space, an axial opening through said valve connected to said space, supply valve means for supplying fluid under pressure to said other chamber, means connecting said supply valve means to said other abutment, said abutments being operative upon an increase in pressure of fluid in said control chamber to close said exhaust valve and to actuate said supply valve means, cylinder means in said control chamber connected to one of said abutments, piston means in said control chamber connected to the other abutment and cooperative with said cylinder means to form another chamber, means opening the last mentioned chamber to said space for thereby reducing the area of said abutments subject to pressure of fluid in said control chamber to a degree less than the area subject to pressure of fluid in said other chamber.

ARTHUR J. BENT.

REFERENCES CITED

The following references are of record in the file of this patent:

UNITED STATES PATENTS

| Number | Name | Date |
| --- | --- | --- |
| 1,538,926 | Cass | May 26, 1925 |